(12) United States Patent
Rhee et al.

(10) Patent No.: US 11,456,608 B2
(45) Date of Patent: Sep. 27, 2022

(54) ELECTRONIC DEVICE AND METHOD FOR COMMUNICATING WITH EXTERNAL DEVICE THROUGH POWER SOURCE LINE

(71) Applicant: Samsung Electronics Co., Ltd., Suwon-si (KR)

(72) Inventors: Daesun Rhee, Suwon-si (KR); Jonghyuk Cho, Suwon-si (KR); Donghun Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/812,070

(22) Filed: Mar. 6, 2020

(65) Prior Publication Data
US 2020/0321792 A1 Oct. 8, 2020

(30) Foreign Application Priority Data

Apr. 4, 2019 (KR) .................. 10-2019-0039593

(51) Int. Cl.
*H02J 7/00* (2006.01)
*H04R 1/10* (2006.01)
(Continued)

(52) U.S. Cl.
CPC ........ *H02J 7/0045* (2013.01); *H02J 7/00034* (2020.01); *H02J 7/0049* (2020.01);
(Continued)

(58) Field of Classification Search
CPC .... H02J 7/0045; H02J 7/00034; H02J 7/0049; H02J 7/00304; H02J 7/0036;
(Continued)

(56) References Cited

U.S. PATENT DOCUMENTS 10,104,463 B2 10/2018 Kim et al.
10,129,626 B1 11/2018 Jung et al.
(Continued)

FOREIGN PATENT DOCUMENTS

CN 108242839 A 7/2018
CN 108879847 A 11/2018
(Continued)

OTHER PUBLICATIONS

International Search Report dated Jun. 15, 2020 in connection with International Patent Application No. PCT/KR2020/003009, 3 pages.
(Continued)

*Primary Examiner* — Zixuan Zhou

(57) ABSTRACT

An electronic device includes a battery, a charging integrated circuit (IC) configured to control a charging state of the battery, a connector pin for receiving power from an external device, the connector pin including a first connector pin for receiving a high potential voltage from the external device and a second connector pin for receiving a low potential voltage from the external device, a touch sensor, and a controller. The controller receives power from the external device through the connector pin based on the detection of the external device being connected to the connector pin, charges the battery using a high potential voltage, detects a user input through the touch sensor while the battery is charged, and stops the charging of the battery and outputs a current corresponding to state information of the electronic device through the first connector pin based on the detection of the given user input.

11 Claims, 12 Drawing Sheets

(51) Int. Cl.
*G06F 3/01* (2006.01)
*A45C 11/00* (2006.01)

(52) U.S. Cl.
CPC ...... *H04R 1/1025* (2013.01); *A45C 2011/001* (2013.01); *G06F 3/017* (2013.01); *H02J 7/0036* (2013.01); *H02J 7/00304* (2020.01); *H04R 2420/07* (2013.01)

(58) Field of Classification Search
CPC .............. H04R 1/1025; H04R 2420/07; H04R 2420/09; A45C 2011/001; G06F 3/017
USPC ........................................................ 320/107
See application file for complete search history.

(56) References Cited

U.S. PATENT DOCUMENTS

| | | |
|---|---|---|
| 10,784,722 B2 | 9/2020 | Lai |
| 2007/0274549 A1 | 11/2007 | Husung |
| 2015/0207357 A1 | 7/2015 | Youm et al. |
| 2017/0033558 A1* | 2/2017 | Chang Chien ......... H01R 29/00 |
| 2017/0164089 A1 | 6/2017 | Lee et al. |
| 2018/0184191 A1* | 6/2018 | Kim ...................... H04R 1/1041 |
| 2019/0069066 A1* | 2/2019 | Song ...................... H02J 7/0044 |
| 2019/0075385 A1 | 3/2019 | Lee et al. |

FOREIGN PATENT DOCUMENTS

| | | |
|---|---|---|
| CN | 208174945 U | 11/2018 |
| JP | 2012-100248 A | 5/2012 |
| KR | 10-2015-0088368 A | 8/2015 |
| KR | 10-2017-0067050 A | 6/2017 |
| KR | 10-2017-0106617 A | 9/2017 |
| KR | 10-1848669 B1 | 5/2018 |
| KR | 10-1885734 B1 | 9/2018 |
| KR | 10-2019-0025495 A | 3/2019 |
| WO | 2020/192377 A1 | 10/2020 |

OTHER PUBLICATIONS

Written Opinion of the International Searching Authority dated Jun. 15, 2020 in connection with International Patent Application No. PCT/KR2020/003009, 4 pages.

European Patent Office, "Supplementary Partial European Search Report" dated Mar. 10, 2022, in connection with European Patent Application No. 20785214.6, 16 pages.

Supplementary European Search Report dated Jul. 6, 2022 in connection with European Patent Application No. 20 78 5214, 18 pages.

\* cited by examiner

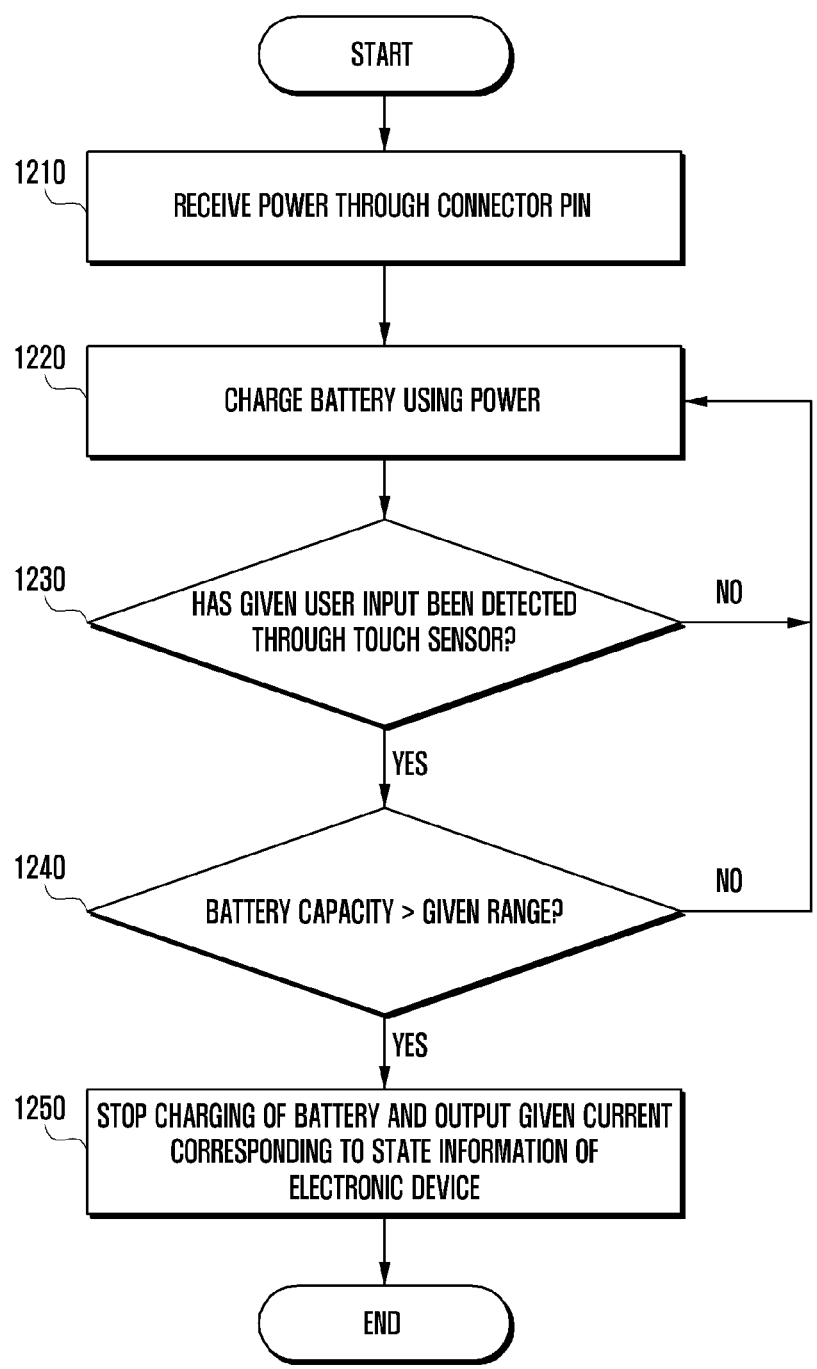

ELECTRONIC DEVICE AND METHOD FOR COMMUNICATING WITH EXTERNAL DEVICE THROUGH POWER SOURCE LINE

CROSS-REFERENCE TO RELATED APPLICATION

This application is based on and claims priority under 35 U.S.C. § 119 to Korean patent application number 10-2019-0039593, filed on Apr. 4, 2019, in the Korean Intellectual Property Office, the disclosure of which is incorporated by reference herein in its entirety.

BACKGROUND

1. Field

The disclosure relates to an electronic device with which a cradle is also provided and to an electronic device and method capable of transmitting and receiving data through a power source pin of a cradle.

2. Description of Related Art

With the help of the electronic technology, various types of electronic devices are developed and supplied. Recently the supply of portable electronic devices having various functions, such as a smartphone, a tablet PC, a smart watch, or a smart earphone, is increased.

The manufacturers of electronic devices provide a cradle for the charging of the battery of an electronic device or for data transmission and reception between an electronic device and an external device. For example, an electronic device may be hearables capable of outputting a sound by performing wireless communication with a smartphone using Bluetooth. The manufacturers of hearables also provide a cradle capable of storing and charging hearables.

SUMMARY

A plurality of connector pins for being brought into contact with a terminal positioned in at least part of an electronic device is positioned in a cradle. The cradle may supply power to the electronic device or transmit and receive data to and from the electronic device through the plurality of connector pins.

In a conventional technology, however, at least three connector pins are necessary for power transmission and reception and data communication. Accordingly, a structure is complicated and a part unit price may rise.

Various embodiments of the disclosure may provide an electronic device having a simple structure and capable of lowering a part unit price by reducing lines for power transmission and reception and data communication and the number of connector pins, and a data communication method of the electronic device.

According to various embodiments of the disclosure, an electronic device for supplying power to an external device includes a housing in which at least one groove for keeping the external device has been formed, a connector pin configured to supply power to the external device, the connector pin including a first connector pin positioned in at least some area of the groove to supply a high potential voltage and a second connector pin positioned in at least another some area of the groove and to supplying a low potential voltage, a power supply configured to supply a given high potential voltage to the first connector pin, a current sensing circuit configured to detect a current of the first connector pin, and a controller operatively connected to the connector pin, the power supply, and the current sensing circuit. The controller may be configured to supply a given high potential voltage to the first connector pin based on the detection of the external device being connected to the connector pin, detect the current of the first connector pin while the given high potential voltage is supplied, extract digital information based on a current change of a given range or more being detected in the first connector pin, and perform a given function based on the extracted digital information.

According to various embodiments of the disclosure, a method of driving an electronic device for supplying power to an external device includes a housing in which at least one groove for keeping the external device has been formed, a connector pin configured to supply power to the external device, the connector pin including a first connector pin positioned in at least some area of the groove to supply a high potential voltage and a second connector pin positioned in at least another some area of the groove and to supplying a low potential voltage, a power supply configured to supply a given high potential voltage to the first connector pin, and a current sensing circuit configured to detect a current of the first connector pin. The method may include supplying a given high potential voltage to the first connector pin based on the detection of the external device being connected to the connector pin, detecting the current of the first connector pin while the given high potential voltage is supplied, extracting digital information based on a current change of a given range or more being detected in the first connector pin, and performing a given function based on the extracted digital information.

According to various embodiments of the disclosure, an electronic device includes a battery, a charging integrated circuit (IC) configured to control a charging state of the battery, a connector pin for receiving power from an external device, the connector pin including a first connector pin for receiving a high potential voltage from the external device and a second connector pin for receiving a low potential voltage from the external device, a touch sensor, and a controller operatively connected to the charging IC, the connector pin, and the touch sensor. The controller may be configured to receive given power from the external device through the connector pin based on the detection of the external device being connected to the connector pin, charge the battery using a given high potential voltage, detect a given user input through the touch sensor while the battery is charged, and stop the charging of the battery and output a given current corresponding to state information of the electronic device through the first connector pin based on the detection of the given user input.

According to various embodiments of the disclosure, in a method of driving an electronic device, the electronic device includes a connector pin for receiving power from an external device, the connector pin including a first connector pin for receiving a high potential voltage from the external device and a second connector pin for receiving a low potential voltage from the external device, and a touch sensor. The method may include receiving a given high potential voltage from the external device through the connector pin based on the detection of the external device being connected to the connector pin, charging the battery using the given high potential voltage, detecting a given user input through the touch sensor while the battery is charged, and stopping the charging of the battery and outputting a given current corresponding to state information of the electronic device through the first connector pin based on the detection of the given user input.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 12 illustrates an operation flowchart of a second electronic device according to an embodiment.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various example embodiments of the disclosure will be described in greater detail with reference to accompanying drawings.

Figure 1:
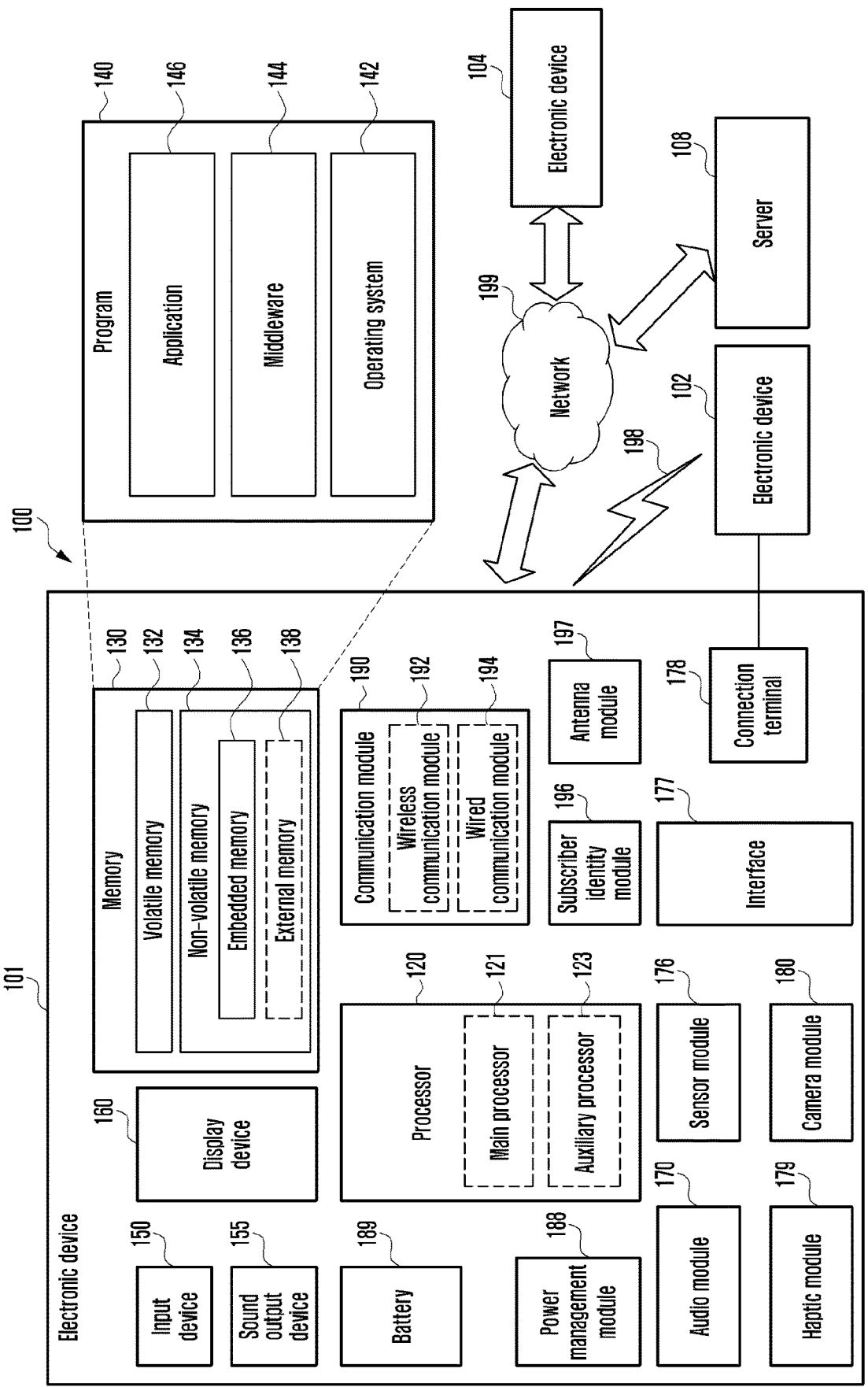
FIG. 1 illustrates a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added to the electronic device 101. In some embodiments, some of the components may be implemented as single integrated circuitry. For example, the sensor module 176 (e.g., a fingerprint sensor, an iris sensor, or an illuminance sensor) may be implemented as being embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or operations. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) coupled with the electronic device 101 directly (e.g., in a wired way) or wirelessly.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., in a wired way) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
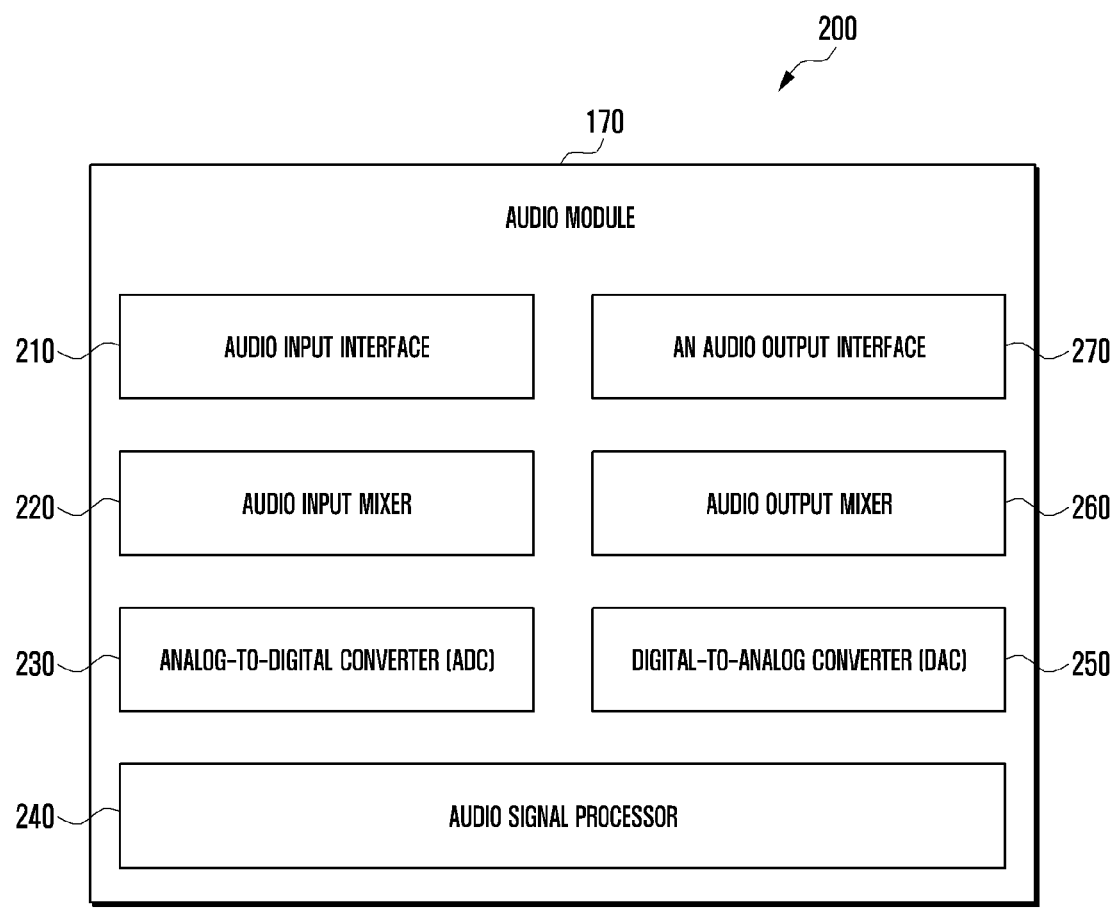
FIG. 2 illustrates a block diagram of an audio module according to various embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
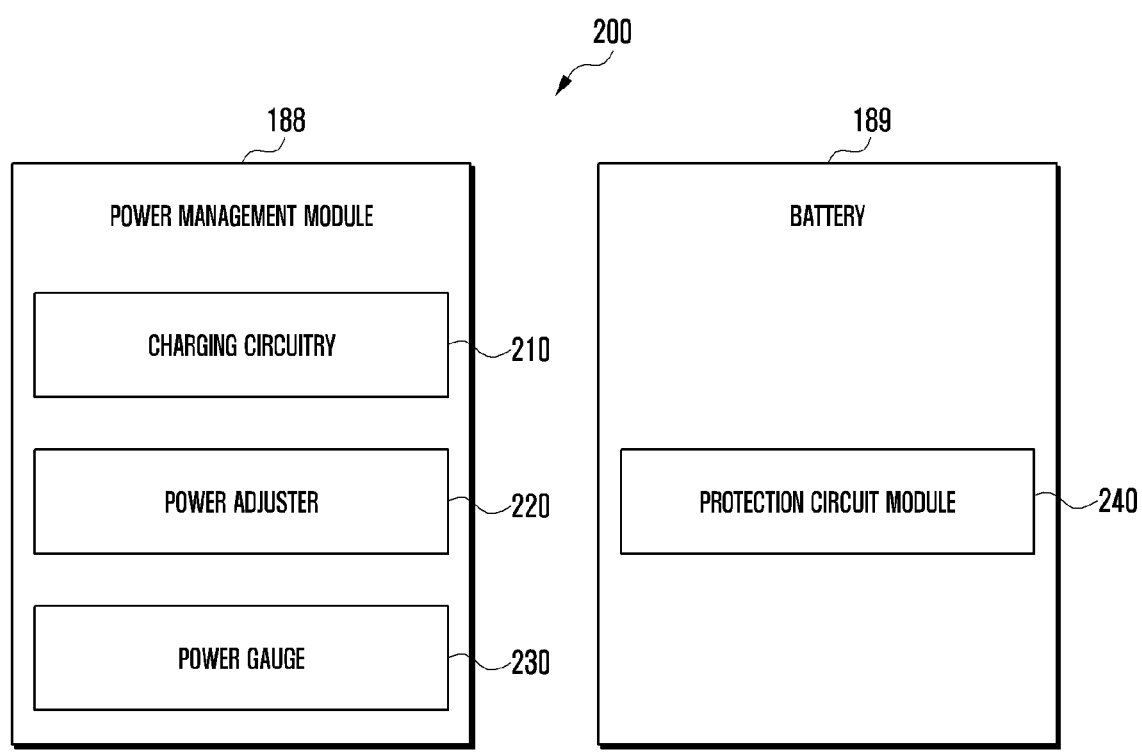
FIG. 3 illustrates a block diagram of a power management module and battery according to various embodiments.

FIG. 3 is a block diagram 300 illustrating the power management module 188 and the battery 189 according to various embodiments. Referring to FIG. 3, the power management module 188 may include charging circuitry 310, a power adjuster 320, or a power gauge 330. The charging circuitry 310 may charge the battery 189 by using power supplied from an external power source outside the electronic device 101. According to an embodiment, the charging circuitry 310 may select a charging scheme (e.g., normal charging or quick charging) based at least in part on a type of the external power source (e.g., a power outlet, a USB, or wireless charging), magnitude of power suppliable from the external power source (e.g., about 20 Watts or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 320 may generate a plurality of powers having different voltage levels or different current levels by adjusting a voltage level or a current level of the power supplied from the external power source or the battery 189. The power adjuster 320 may adjust the voltage level or the current level of the power supplied from the external power source or the battery 189 into a different voltage level or current level appropriate for each of some of the components included in the electronic device 101. According to an embodiment, the power adjuster 320 may be implemented in the form of a low drop out (LDO) regulator or a switching regulator. The power gauge 330 may measure use state information about the battery 189 (e.g., a capacity, a number of times of charging or discharging, a voltage, or a temperature of the battery 189).

The power management module 188 may determine, using, for example, the charging circuitry 310, the power adjuster 320, or the power gauge 330, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 340. The PCM 340 may perform one or more of various functions (e.g., a pre-cutoff function) to prevent a performance deterioration of, or damage to, the battery 189. The PCM 340, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 330, or the power management module 188. According to an embodiment, the corresponding sensor (e.g., a temperature sensor) of the sensor module 176 may be included as part of the PCM 340, or may be disposed near the battery 189 as a separate device.

An electronic device 402 for supplying power to an external device (e.g., 401 in FIG. 6) according to various embodiments of the disclosure may include a housing in which at least one groove for keeping the external device (e.g., 401 in FIG. 6) has been formed, connector pins for supplying power to the external device 401, the connector pins including a first connector pin 431 positioned in at least some area of the groove to supply a high potential voltage and a second connector pin 432 positioned in at least another some area of the groove to supply a low potential voltage, a power supply for supplying a given high potential voltage to the first connector pin 431, a current sensing circuit for detecting a current of the first connector pin 431, and a controller operatively connected to the connector pins, the power supply, and the current sensing circuit. The controller may be configured to supply a given high potential voltage to the first connector pin 431 in response to the detection of the external device 401 connected to the connector pins, to detect a current of the first connector pin 431 while the given high potential voltage is supplied, to extract digital information from a change in the current of a given range or more when the change in the current is detected in the first connector pin 431, and to perform a given function based on the extracted digital information. The external device (e.g., 401 in FIG. 6) may further include a user interface device. The controller may be configured to identify a state of the external device 401 based on the extracted digital information and to control the user interface device to output given notification related to the identified state of the external device 401. The state of the external device 401 may include that the mode of the external device 401 is a Bluetooth pairing mode. The user interface device may further include an LED device. The external device (e.g., 401 in FIG. 6) may further include a sensing resistor positioned between the power supply and the first connector pin 431. The current sensing circuit may detect currents at both ends of the sensing resistor, and may transmit, to the controller, a comparison value between the currents at both ends of the sensing resistor. The controller may be configured to receive the comparison value from the current sensing circuit and to extract the digital information from a change in the current of the first connector pin 431 when the comparison value exceeds a reference value.

In a method of driving an electronic device (e.g., 402 in FIG. 6) for supplying power to an external device (e.g., 401 in FIG. 6) according to various embodiments of the disclosure, the electronic device 402 may include a housing in which at least one groove for keeping the external device 401 has been formed, connector pins for supplying power to the external device 401, the connector pins including a first connector pin 431 positioned in at least some area of the groove to supply a high potential voltage and a second connector pin 432 positioned in at least another some area of the groove to supply a low potential voltage, a power supply for supplying a given high potential voltage to the first connector pin 431, a current sensing circuit for detecting a current of the first connector pin 431. The method may include an operation of supplying a given high potential voltage to the first connector pin 431 in response to the detection of the external device 401 connected to the connector pins, an operation of detecting a current of the first connector pin 431 while the given high potential voltage is supplied, an operation of extracting digital information from a change in the current of a given range or more when the change in the current is detected in the first connector pin 431, and an operation of performing a given function based on the extracted digital information. The method may further include an operation of identifying a state of the external device 401 based on the extracted digital information and an operation of outputting given notification related to the identified state of the external device 401. The state of the external device 401 may include that the mode of the external device 401 is a Bluetooth pairing mode. The electronic device 402 may include a sensing resistor positioned between the power supply and the first connector pin 431. The operation of detecting the current of the first connector pin 431 may include an operation of detecting currents at both ends of the sensing resistor and an operation of identifying a comparison value between the currents at both ends of the sensing resistor. The operation of extracting the digital information may include an operation of comparing the comparison value with a reference value and an operation of extracting the digital information from a change in the current of the first connector pin 431 when the comparison value exceeds the reference value.

An electronic device (e.g., 401 in FIG. 6) according to various embodiments of the disclosure may include a battery, a charging integrated circuit (IC) configured to control the charging state of the battery, connector pins for being supplied with power from the external device 402, the connector pins including a first connector pin 431 for receiving a high potential voltage from the external device 402 and a second connector pin 432 for receiving a low potential voltage from the external device 402, a touch sensor, and a controller operatively connected to the charging IC, the connector pin, and the touch sensor. The controller may be configured to receive given power from the external device 402 through the connector pins in response to the detection of the external device 402 connected to the connector pins, to charge the battery using the given high potential voltage, to detect a given user input through the touch sensor while charging the battery, to stop the charging of the battery when the given user input is detected, and to output a given current corresponding to state information of the electronic device 401 through the first connector pin 431. The controller may be configured to change its mode to a data transmission mode when the given user input is detected, to generate a control signal corresponding to state information of the electronic device 401, and to generate the given current based on the generated control signal. The electronic device (e.g., 401 in FIG. 6) may further include a pull-down resistor connected to the first connector pin 431 and a switching element positioned between the first connector pin 431 and the pull-down resistor to control a connection between the first connector pin 431 and the pull-down resistor in response to the control signal. The data transmission mode may be a mode to notify that the mode of the electronic device 401 is a Bluetooth pairing mode.

In a method of driving an electronic device (e.g., 401 in FIG. 6) according to various embodiments of the disclosure, the electronic device 401 may include connector pins for being supplied with power from the external device 402, the connector pins including a first connector pin 431 for receiving a high potential voltage from the external device 402 and a second connector pin 432 for receiving a low potential voltage from the external device 402, and a touch sensor. The method may include an operation of receiving a given high potential voltage from the external device 402 through the first connector pin 431 in response to the detection of the external device 402 connected to the connector pins, an operation of charging a battery using the given high potential voltage, an operation of detecting a given user input through the touch sensor while charging the battery, and an operation of stopping the charging of the battery when the given user input is detected and outputting a given current corresponding to state information of the electronic device 401 through the first connector pin 431. The operation of outputting the given current may include an operation of switching to a data transmission mode when the given user input is detected, an operation of generating a control signal corresponding to the state information of the electronic device 401, and an operation of generating the given current based on the generated control signal. The electronic device 401 may further include a pull-down resistor connected to the first connector pin 431 and a switching element positioned between the first connector pin 431 and the pull-down resistor to control a connection between the first connector pin 431 and the pull-down resistor in response to the control signal. The operation of outputting the given current may include an operation of controlling the switching element based on the control signal. The data transmission mode may be a mode to notify that the mode of the electronic device 401 is a Bluetooth pairing mode. The operation of outputting the given current may include an operation of identifying the capacity of the battery when the given user input is detected and an operation of switching to a data transmission mode when the capacity of the battery is a given range or more.

Figure 4:
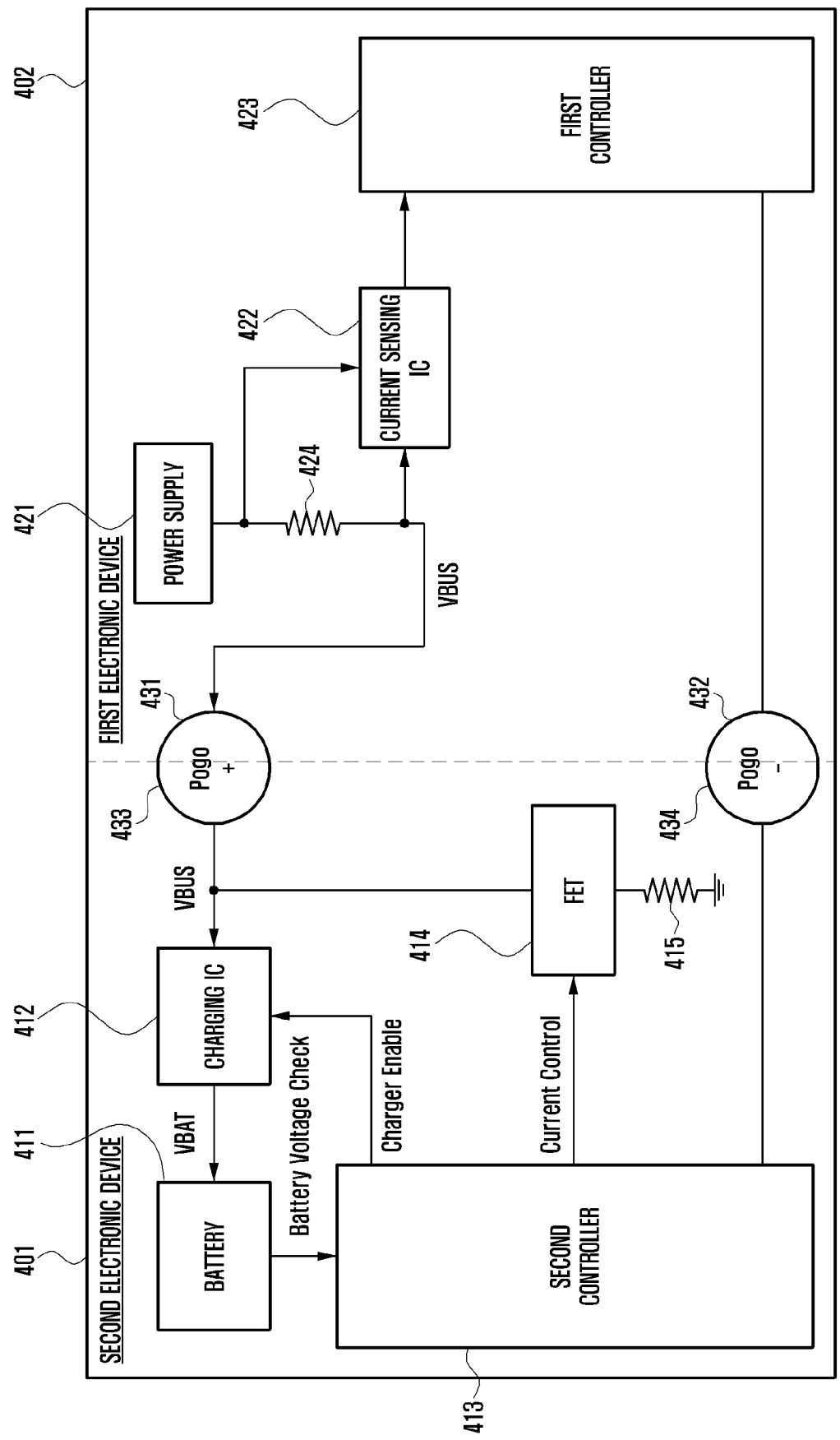
FIG. 4 illustrates a block diagram of electronic devices according to various embodiments.

FIG. 4 illustrates a block diagram of electronic devices according to various embodiments.

Referring to FIG. 4, various embodiments of the disclosure may include a first electronic device 402 and a second electronic device 401. For example, the second electronic device 401 may be a portable device for being supplied with power from the first electronic device 402 and charging a battery 411 using the supplied power. For example, the first electronic device 402 may be a cradle 402 (or casing) for keeping the second electronic device 401, and may supply power to the second electronic device 401 while keeping the second electronic device 401. According to one embodiment, the second electronic device 401 may be hearables 401. The first electronic device 402 may be a cradle 402 capable of keeping the hearables 401. For example, the second electronic device 401 may be hearables 401 connected to a third electronic device (e.g., a third electronic device 403 in FIG. 5) through short-distance communication (e.g., Bluetooth).

Figure 6:
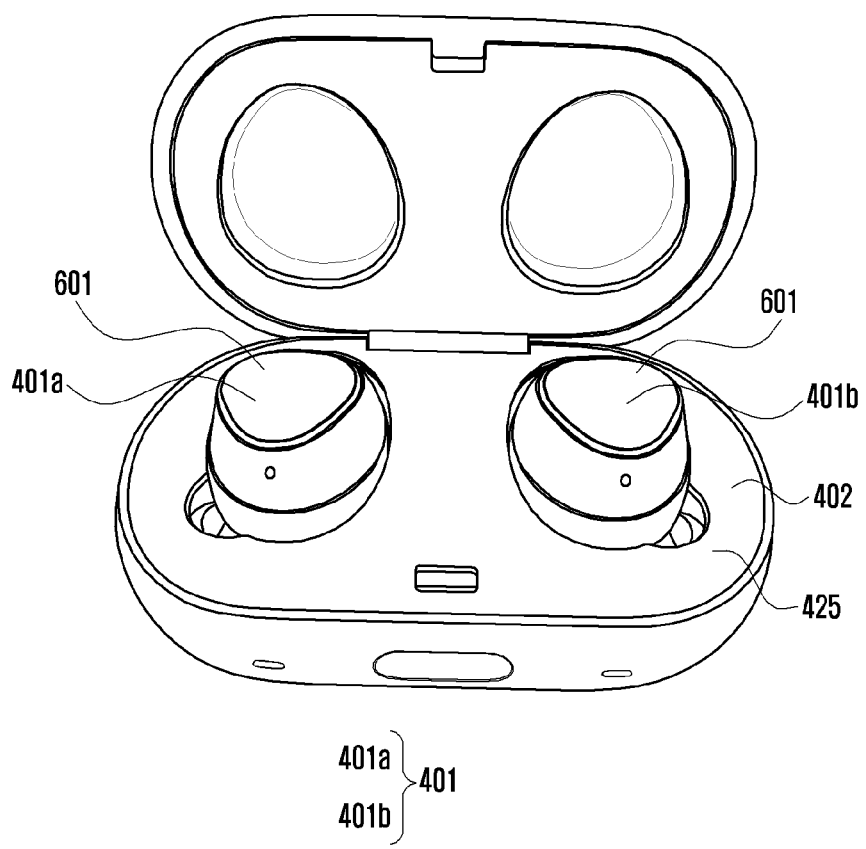
FIG. 6 is an example illustrating an external appearance of hearables and a cradle according to various embodiments.

First electronic device 402 (e.g., cradle 402 illustrated in FIG. 6)

According to one embodiment, the first electronic device 402 may include connector pins 431 and 432 for supplying power to the second electronic device 401, a power supply 421 for supplying a given voltage to the connector pins 431 and 432, a current sensing IC 422 for detecting currents of the connector pins 431 and 432, and a first controller 423 operatively connected to the connector pins 431 and 432, the power supply 421, and the current sensing circuit.

According to one embodiment, pogo pins may be used as the connector pins 431 and 432. For example, the connector pins 431 and 432 may include a first connector pin 431 for supplying a high potential voltage (e.g., pogo +) and a second connector pin 432 for supplying a low potential voltage (e.g., pogo −). For example, the low potential voltage may be the ground. According to various embodiments, the connector pins 431 and 432 are not limited to the pogo pins, and may include known pins protruded to physically come into contact with a terminal of an external device.

According to one embodiment, the power supply 421 may convert power, stored in a battery, or power, supplied by an external power supply, into a given voltage, and may output the converted voltage to the connector pins 431 and 432 when the second electronic device 401 is connected to the connector pins 431 and 432. For example, when the second electronic device 401 is connected to the connector pins 431 and 432, the power supply 421 may output a given high potential voltage (e.g., VBUS) to the first connector pin 431.

According to one embodiment, the first electronic device 402 may include a sensing resistor 424 positioned between the power supply 421 and the first connector pin 431. According to one embodiment, the current sensing IC 422 may detect currents at both ends of the sensing resistor 424, and may transmit, to the first controller 423, a comparison value between the currents at both ends of the sensing resistor 424. For example, the current sensing IC 422 may include a comparator for outputting a comparison value by comparing currents at both ends of the sensing resistor 424 and an analog-digital converter for converting the comparison value from the comparator into digital information.

According to one embodiment, the first controller 423 may control an overall operation of the first electronic device 402. For example, the first controller 423 may control the charging state of a battery included in the first electronic device 402. For another example, the first controller 423 may control the supply of power through the connector pins 431 and 432 when the second electronic device 401 is connected to the connector pins 431 and 432.

According to one embodiment, the first controller 423 may identify whether data is transmitted by the second electronic device 401 by detecting a change in the current of the first connector pin 431 while power is supplied through the connector pins 431 and 432. According to one embodiment, an operation for the first controller 423 to detect a change in the current of the first connector pin 431 may include an operation for the first controller 423 to receive a comparison value between currents at both ends of the sensing resistor 424 from the current sensing IC 422 and to identify whether the received value is greater than a given value (e.g., reference value).

According to one embodiment, the first controller 423 may identify the state of the second electronic device 401 transmitting data when a current change of a given range or more is detected in the first connector pin 431 while power is supplied through the connector pins 431 and 432. According to one embodiment, if the state of the second electronic device 401 transmitting data is identified, the first controller 423 may obtain the data transmitted by the second electronic device 401 by extracting digital information from a change in the current using the current sensing IC 422. For example, the first controller 423 may receive a comparison value between currents at both ends of the sensing resistor 424 from the current sensing IC 422, may identify the state of the second electronic device 401 transmitting data when the received value is greater than a given value, and may obtain the data transmitted by the second electronic device 401 based on a change in the comparison value between currents at both ends of the sensing resistor 424.

According to one embodiment, the first controller 423 may obtain data transmitted by the second electronic device 401 based on a change in the comparison value between currents at both ends of the sensing resistor 424. The data may be information related to the state of the second electronic device 401, for example. For example, the first controller 423 may identify a state of the second electronic device 401 based on digital information extracted by the current sensing IC 422, and may perform a given function based on the identified state of the second electronic device 401. For example, if the state of the second electronic device 401 is a given state, the first controller 423 may control a user interface device (e.g., an LED device 713 in FIG. 7) to output given notification related to the state of the second electronic device 401. For example, if the mode of the second electronic device 401 is a short-distance communication mode, for example, in a Bluetooth pairing mode, the first controller 423 may control a user interface device (e.g., the LED device 713 in FIG. 7) to output notification for notifying that the mode of the second electronic device 401 is the Bluetooth pairing mode. A user can recognize that the mode of the second electronic device 401 is the Bluetooth pairing mode through a user interface device (e.g., the LED device 713 in FIG. 7) positioned in the first electronic device 402.

Second electronic device 401 (e.g., hearables 401 illustrated in FIG. 6)

According to one embodiment, the second electronic device 401 is a portable electronic device, and may be hearables 401 which may be kept in a housing (e.g., housing 425 in FIG. 7) of the first electronic device 402, for example. According to one embodiment, the second electronic device 401 may include a battery 411, a charging IC 412 configured to control the charging state of the battery 411, terminals 433 and 434 configured to be physically brought into contact with the connector pins 431 and 432 of the first electronic device 402 while the second electronic device 401 is kept in the housing 425 of the first electronic device 402, a touch sensor (e.g., a touch sensor 601 in FIG. 6), and a second controller 413 operatively connected to the charging IC 412, the terminals 433 and 434, and the touch sensor 601.

According to one embodiment, the second electronic device 401 may include the terminals 433 and 434 physically brought into contact with the first connector pin 431 of the first electronic device 402 while the second electronic device 401 is kept in the housing 425 of the first electronic device 402. For example, the terminals 433 and 434 of the second electronic device 401 may include a first terminal 433 for receiving a high potential voltage by being physically brought into contact with the first connector pin 431 of the first electronic device 402 and a second terminal 434 for receiving a low potential voltage by being physically brought into contact with the second connector pin 432 of the first electronic device 402.

According to one embodiment, the charging IC 412 may operate identically or similar to the power management module 188 of FIG. 3.

According to one embodiment, the charging IC 412 may receive a given high potential voltage from the first electronic device 402 when the first terminal 433 is physically brought into contact with the first connector pin 431 of the first electronic device 402, and may charge the battery 411 using the received high potential voltage. For example, the charging IC 412 may generate a different voltage or different current level to parts included in the second electronic device 401 using the received high potential voltage.

According to one embodiment, the second controller 413 may control an overall operation of the second electronic device 401. For example, the second controller 413 may check a voltage of the battery 411, and may enable or disable the charging IC 412 based on a result of the check of the voltage of the battery 411. According to one embodiment, the second controller 413 may receive a user input through an input device (e.g., the touch sensor 601 in FIG. 6), and may control a change from a charging mode to a data transmission mode in response to the user input. For example, the charging mode may be a mode in which the second electronic device 401 charges the battery 411 using power transmitted by the first electronic device 402. The data transmission mode may be a mode in which the second electronic device 401 does not charge the battery 411 by disabling the charging IC 412 and transmits state information of the second electronic device 401 to the first electronic device 402 using the terminals 433 and 434 through which power is received.

According to one embodiment, the second electronic device 401 may include a pull-down resistor 415 connected to the first terminal 433, and may include a switching element (e.g., a field effect transistor (FET)) 414 positioned between the first terminal 433 and the pull-down resistor 415. According to one embodiment, the second controller 413 may detect a given user input (e.g., a user input 1001 in FIG. 10) through a touch sensor (e.g., the touch sensor 601 in FIG. 6), that is, an input device, and may control a change from a charging mode to a data transmission mode in response to the user input. For example, the second controller 413 may control power, received through the first terminal 433, to be supplied to the charging IC 412 by enabling the charging IC 412 and turning off the switching element 414 during the charging mode. Furthermore, the second controller 413 may connect the first terminal 433 and the pull-down resistor 415 by disabling the charging IC 412 and turning on the switching element 414 during the data transmission mode. According to one embodiment, when the first terminal 433 and the pull-down resistor 415 are connected while power is received through the first terminal 433, a current of the first terminal 433 temporarily rises. Accordingly, the second electronic device 401 may notify the first electronic device 402 of the start of the data transmission mode. For example, the first electronic device 402 may identify that the mode of the second electronic device 401 is the data transmission mode by detecting a change in the current of the first connector pin 431 physically brought into contact with the first terminal 433.

According to one embodiment, the second electronic device 401 may transmit data to the first electronic device 402 in such a manner that a current of the first terminal 433 has a change in the current corresponding to given bit information by repeatedly controlling the turn-on or turn-off of the switching element 414 using a control signal during a data transmission mode. According to one embodiment, the first electronic device 402 may detect a change in the current through the first connector pin 431, and may obtain the data by extracting the given bit information based on a change in the current.

According to one embodiment, the second controller 413 may change its mode to a data transmission mode in response to a given user input, and may generate a control signal corresponding to state information of the second electronic device 401. For example, the given user input may be a user input that requests the second electronic device 401 to perform short-distance communication. The second controller 413 may perform short-distance communication in response to the user input, and may generate a control signal for notifying the state of the second electronic device 401 performing short-distance communication while performing the short-distance communication. For example, if the second electronic device 401 is the hearables 401, the second electronic device 401 may receive, from a user, a user input to request entry into a Bluetooth pairing mode, and may transmit data for notifying the Bluetooth pairing mode to the first electronic device 402, that is, the cradle 402, through a terminal, that is, power reception means, during the Bluetooth pairing mode. To this end, the second controller 413 may disable the charging IC 412, and may control the switching element 414 by outputting a given control signal corresponding to the Bluetooth pairing mode. Accordingly, a current of the first terminal 433 swings in accordance with the switching operation of the switching element 414 based on the given control signal. The first electronic device 402 may identify that the mode of the second electronic device 401 is the Bluetooth pairing mode by detecting the swinging current through the first connector pin 431.

According to one embodiment, the first electronic device 402 may perform a given function in response to the identification of the second electronic device 401 to be in a Bluetooth pairing mode, and may output given notification using an LED device (e.g., the LED device 713 in FIG. 7), for example. For example, a user can recognize that the mode of the second electronic device 401 is a Bluetooth pairing mode through the LED device 713 of the first electronic device 402 after a user input to request the second electronic device 401 to enter the Bluetooth pairing mode.

According to various embodiments, although the second electronic device 401 does not include a device for outputting visual notification, for example, an LED device, the number of parts can be reduced and an intuitive interface can be provided to a user if the first electronic device 402 outputs visual notification related to the state of the second electronic device 401. According to various embodiments, if the second electronic device 401 transmits data to the first electronic device 402, data transmission means may be the terminals 433 and 434 for transmitting and receiving power. Accordingly, a structure is simple, and the number of parts can be reduced.

According to one embodiment, the Bluetooth pairing mode is a registration process for electronic devices using Bluetooth communication to be interconnected and to operate. For example, the Bluetooth pairing mode may include an operation for the second electronic device 401 to register a connection with an external device (e.g., a third electronic device (e.g., the third electronic device 403 in FIG. 5)). According to one embodiment, the second electronic device 401 may include a multi-pairing function for connecting and using two or more external devices.

Figure 5:
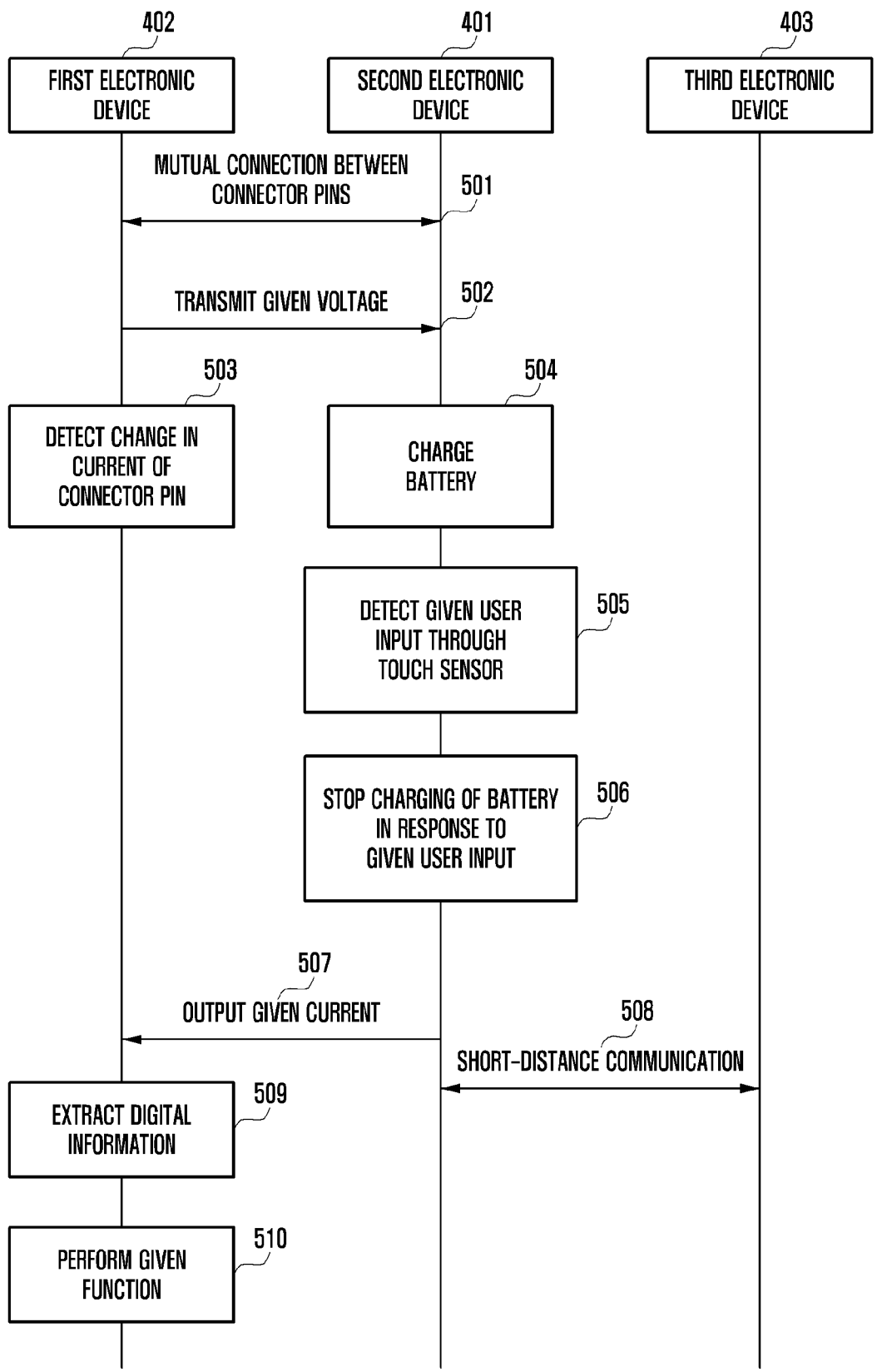
FIG. 5 illustrates an operation flowchart of electronic devices according to various embodiments.

FIG. 5 illustrates an operation flowchart of electronic devices according to various embodiments.

At operation 501, a user may keep the second electronic device 401 in a housing (e.g., the housing 425 in FIG. 7) of the first electronic device 402. Accordingly, connector pins (e.g., the connector pins 431 and 432 in FIG. 4) of the first electronic device 402 and terminals (e.g., the terminals 433 and 434 in FIG. 4) of the second electronic device 401 may be physically brought into contact with each other. According to one embodiment, the first electronic device 402 and the second electronic device 401 may identify that they have been connected by detecting physical contacts between the connector pins 431 and 432 and the terminals 433 and 434. For example, the first electronic device 402 may identify that it has been connected to the second electronic device 401 by detecting that the first terminal 433 is brought into contact with the first connector pin 431 and the second terminal 434 is brought into contact with the second connector pin 432. For another example, the second electronic device 401 may identify that it has been connected to the first electronic device 402 by detecting that first connector pin 431 is brought into contact with the first terminal 433 and that the second connector pin 432 is brought into contact with the second terminal 434.

At operation 502, the first electronic device 402 according to one embodiment may transmit power of a given voltage to the second electronic device 401 in response to the identification of the second electronic device 401 connected thereto through the connector pins 431 and 432. For example, the first electronic device 402 may generate a high potential voltage suitable for the second electronic device 401 using power stored in the battery 411, and may output the generated high potential voltage to the first connector pin 431. Alternatively, the first electronic device 402 may generate a high potential voltage suitable for the second electronic device 401 using an external power source device (e.g., a travel adapter (TA)), and may output the generated high potential voltage to the first connector pin 431.

At operation 503, the first electronic device 402 according to one embodiment may detect a change in the current of the connector pins 431 and 432 while supplying power of the given voltage. For example, the first electronic device 402 may detect a change in the current of the first connector pin 431 while outputting a given high potential voltage to the first connector pin 431. According to one embodiment, the first controller 423 may identify whether data is transmitted by the second electronic device 401 by detecting a change in the current of the first connector pin 431 while power is supplied through the connector pins 431 and 432. According to one embodiment, an operation for the first controller 423 to detect a change in the current of the first connector pin 431 may include an operation for the first controller 423 to receive a comparison value between currents at both ends of the sensing resistor 424 from the current sensing IC 422 and to identify whether the received value is greater than a given value (e.g., a reference value). According to one embodiment, the first electronic device 402 may perform operation 509 and operation 510 when a current change of a given range or more is detected in the first connector pin 431, and may continue to perform operation 502 when a change in the current of a given range or more is not detected.

At operation 504, the second electronic device 401 according to one embodiment may receive power of a given voltage from the first electronic device 402, and may charge the battery 411 using the given voltage. For example, the second controller 413 of the second electronic device 401 may control a high potential voltage to be applied to the charging IC 412 by enabling the charging IC 412 and turning off the switching element 414 connected to the first terminal 433 to which the high potential voltage is applied. According to one embodiment, the charging IC 412 may charge the battery 411 using a high potential voltage, and may generate different voltages or different current levels suitable for parts included in the second electronic device 401.

At operation 505, the second electronic device 401 according to one embodiment may detect a given user input through a touch sensor (e.g., the touch sensor 601 in FIG. 6) while charging the battery 411. For example, the given user input may be a user input to request the second electronic device 401 to perform short-distance communication. According to one embodiment, the second electronic device 401 may be the hearables 401, and may receive a user input (e.g., the user input 1001 in FIG. 10) to request entry into a Bluetooth pairing mode through the touch sensor 601 positioned in at least some of the hearables 401.

At operation 506, the second electronic device 401 according to one embodiment may stop the charging of the battery 411 in response to the given user input 1001, and may change its mode to a data transmission mode. For example, the second electronic device 401 may disable the charging IC 412 in the data transmission mode.

At operation 507 and operation 508, the second electronic device 401 according to one embodiment may output a given current through a terminal. For example, the second electronic device 401 may connect the first terminal 433 and the pull-down resistor 415 by turning on the switching element 414. According to one embodiment, when the first terminal 433 and the pull-down resistor 415 are connected while power is received through the first terminal 433, a current of the first terminal 433 temporarily rises. Accordingly, the second electronic device 401 may notify the first electronic device 402 of the start of the data transmission mode. For example, the first electronic device 402 may identify that the mode of the second electronic device 401 is the data transmission mode by detecting a change in the current of the first connector pin 431 being physically brought into contact with the first terminal 433.

According to one embodiment, the second electronic device 401 may transmit data to the first electronic device 402 in such a manner that a current of the first terminal 433 has a change in the current corresponding to given bit information by repeatedly controlling the turn-on or turn-off of the switching element 414 using a control signal. For example, the second controller 413 of the second electronic device 401 may generate a control signal corresponding to state information of the second electronic device 401. According to one embodiment, a given user input (e.g., 1001 in FIG. 10) may be a user input to request the second electronic device 401 to perform short-distance communication. The second controller 413 may perform short-distance communication with an external device, for example, a third electronic device (e.g., the third electronic device 403 in FIG. 4) in response to the user input 1001. The second controller 413 may generate a control signal for notifying the state of the second electronic device 401 performing short-distance communication while performing the short-distance communication.

According to one embodiment, the third electronic device may be a device capable of being connected to the hearables 401, and may be a smartphone or a tablet PC, for example.

According to one embodiment, if the second electronic device 401 is the hearables 401, the second electronic device 401 may receive, from a user, a user input to request entry into a Bluetooth pairing mode, and may transmit data for notifying the Bluetooth pairing mode to the first electronic device 402, that is, the cradle 402, through the connector pins 431 and 432, that is, power source transmission means during the Bluetooth pairing mode. To this end, the second controller 413 may disable the charging IC 412, and may control the switching element 414 by outputting a given control signal corresponding to the Bluetooth pairing mode.

At operation 509 and operation 510, the first electronic device 402 according to one embodiment may detect a change in the current of the connector pins 431 and 432 when a current of the connector pins 431 and 432 exceeds a given range, may extract digital information based on a value of a change in the current, and may perform a given function based on the extracted digital information. For example, the first controller 423 may identify the state of the second electronic device 401 transmitting data when a current change of a given range or more is detected in the first connector pin 431 while power is supplied through the connector pins 431 and 432. According to one embodiment, if the state of the second electronic device 401 transmitting data is identified, the first controller 423 may obtain the data transmitted by the second electronic device 401 by extracting digital information based on a change in the current using the current sensing IC 422. For example, the first controller 423 may receive a comparison value between currents at both ends of the sensing resistor 424 from the current sensing IC 422, may identify the state of the second electronic device 401 transmitting data when the received value is greater than a given value, and may obtain data transmitted by the second electronic device 401 based on a change in the comparison value between the currents at both ends of the sensing resistor 424.

According to one embodiment, the first controller 423 may obtain data, transmitted by the second electronic device 401, based on a change in the comparison value between currents at both ends of the sensing resistor 424. The data may be information related to the state of the second electronic device 401, for example. For example, the first controller 423 may identify a state of the second electronic device 401 based on digital information extracted by the current sensing IC 422, and may perform a given function based on the identified state of the second electronic device 401. For example, if the state of the second electronic device 401 is a given state, the first controller 423 may control a user interface device (e.g., the LED device 713 in FIG. 7) to output given notification related to the state of the second electronic device 401. For example, if the mode of the second electronic device 401 is a short-distance communication mode, for example, a Bluetooth pairing mode, the first controller 423 may control a user interface device (e.g., the LED device 713 in FIG. 7) to output notification for notifying that the mode of the second electronic device 401 is the Bluetooth pairing mode. A user can recognize that the mode of the second electronic device 401 is the Bluetooth pairing mode through a user interface device (e.g., the LED device 713 in FIG. 7) positioned in the first electronic device 402.

Figure 7:
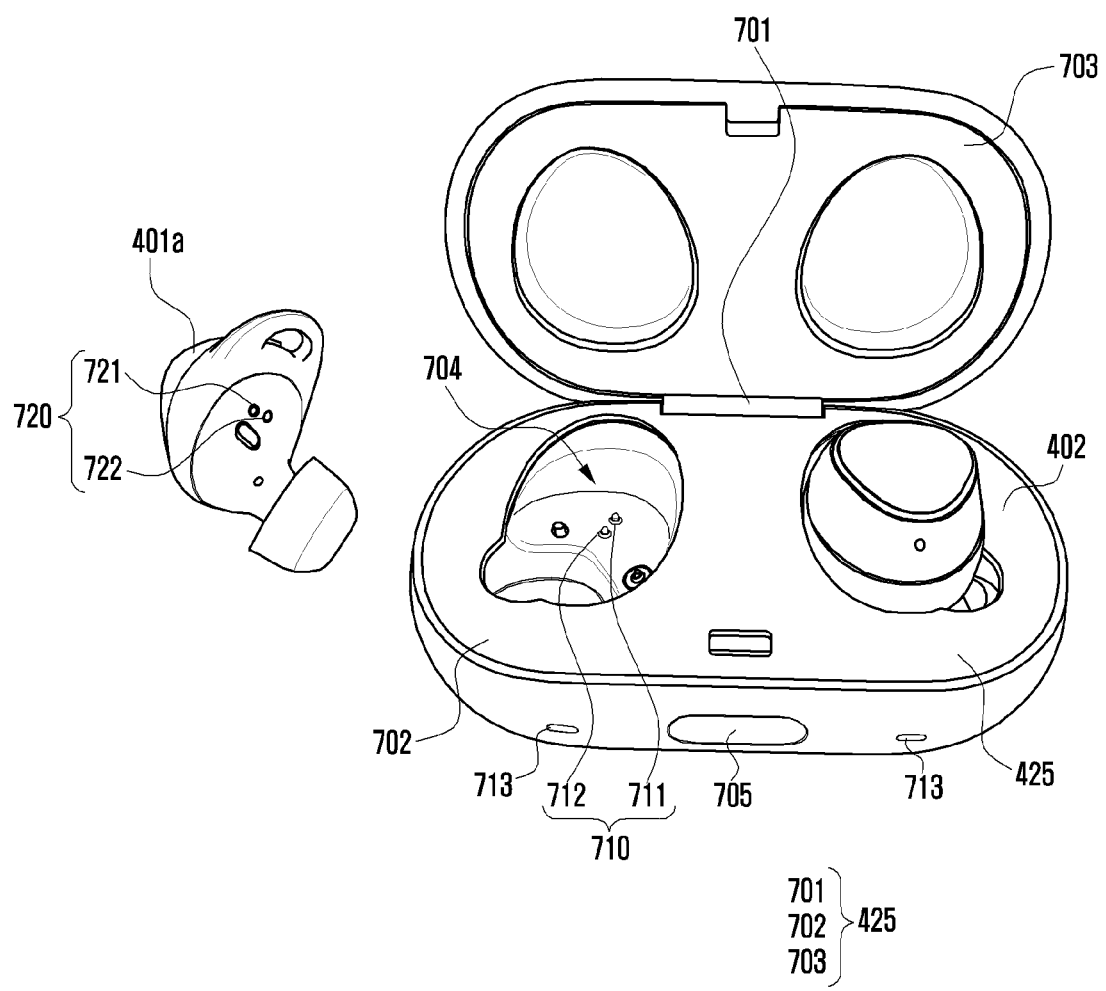
FIG. 7 is an example illustrating a physical contact method between connector pins and terminals according to various embodiments.

FIG. 6 is an example illustrating an external appearance of hearables (e.g., the second electronic device 401 in FIG. 4) and a cradle (e.g., the first electronic device 402 in FIG. 4) according to various embodiments. FIG. 7 is an example illustrating connector pins (e.g., the connector pins 431 and 432 in FIG. 4) and terminals (e.g., the terminals 433 and 434 in FIG. 4) according to various embodiments.

As illustrated in FIGS. 6 and 7, the first electronic device 402 according to one embodiment of the disclosure may be a cradle 402. The second electronic device 401 may be hearables 401 capable of being kept in the cradle 402.

According to one embodiment, the cradle 402 may include a housing 425 configured in a casing form in which the hearables 401 can be kept.

According to one embodiment, the housing 425 may include a first housing structure 701 in which grooves 704 having the hearables 401 seated therein have been formed, a second housing structure 703 playing a role of the cover of the first housing structure 701, and a hinge structure 702 configured to rotatably couple the first housing structure 701 and the second housing structure 703. For example, in an open state in which the second housing structure 703 forms a given angle to the first housing structure 701, one side of the first housing structure 701 may be connected to one side of the second housing structure 703 through the hinge structure 702.

According to one embodiment, the hearables 401 may include a first hearable 401a configured to be inserted into the left ear of a user and a second hearable 401b configured to be inserted into the right ear of a user. According to one embodiment, the first hearable 401a and the second hearable 401b may be seated in the grooves 704 formed in the first housing structure 701. According to one embodiment, the grooves 704 of the first housing structure 701 may be configured so that the ear plugs of the hearables 401 are inserted into the grooves 704.

The example of FIG. 6 may illustrate the state in which the first hearable 401a and the second hearable 401b have been seated in the grooves 704 formed in the first housing structure 701. According to one embodiment, when the hearables 401 are seated in the grooves 704, the opposite sides of the ear plugs of the hearables 401 may be exposed when viewed from the top of the first housing structure 701.

According to one embodiment, a touch sensor 601 may be positioned on each of the opposite sides of the ear plugs of the hearables 401. A user may control a function of the hearables 401 using the touch sensors 601. For example, in the state in which a user has the ear plugs inserted into his or her ears, the user may perform a function of the hearables 401, for example, volume control or control of the selection of song using the touch sensors 601. For another example, the touch sensors 601 are exposed even in the state in which the hearables 401 have been seated in the grooves 704 of the cradle 402. Accordingly, a user may control the hearables 401 using the touch sensors 601 in the state in which the hearables 401 have been seated in the grooves 704. For example, a user may control short-distance communication, for example, a Bluetooth communication pairing mode using the touch sensors 601 in the state in which the hearables 401 have been seated in the cradle 402.

As illustrated in FIG. 7, a connector pin 710 for supplying power to the hearables 401 may be positioned in the groove 704 of the first housing structure 701. For example, the connector pin 710 may include a first connector pin 711

(e.g., the first connector pin 431 in FIG. 4) for supplying a high potential voltage and a second connector pin 712 (e.g., the second connector pin 432 in FIG. 4) for supplying a low potential voltage.

According to one embodiment, a terminal 720 physically brought into contact with the connector pins 431 and 432 while the hearables 401 are seated in the grooves 704 of the first housing structure 701 may be positioned in the hearables 401. For example, the terminal 720 may include a first terminal 721 (e.g., the first terminal 433 in FIG. 4) physically brought into contact with the first connector pin 711 and a second terminal 722 (e.g., the second terminal 434 in FIG. 4) physically brought into contact with the second connector pin 712, while the hearables 401 are seated in the grooves 704. According to one embodiment, the terminal 720 of the hearables 401 may be positioned on the side on which the ear plug has been formed (e.g., the side opposite the touch sensor 601) because the ear plugs of the hearables 401 are configured to be inserted into the grooves 704 of the first housing structure 701. Accordingly, the terminal 720 of the hearables 401 may be physically brought into contact with the connector pin 710 of the cradle 402 while the hearables 401 are seated in the grooves 704.

Figure 8:
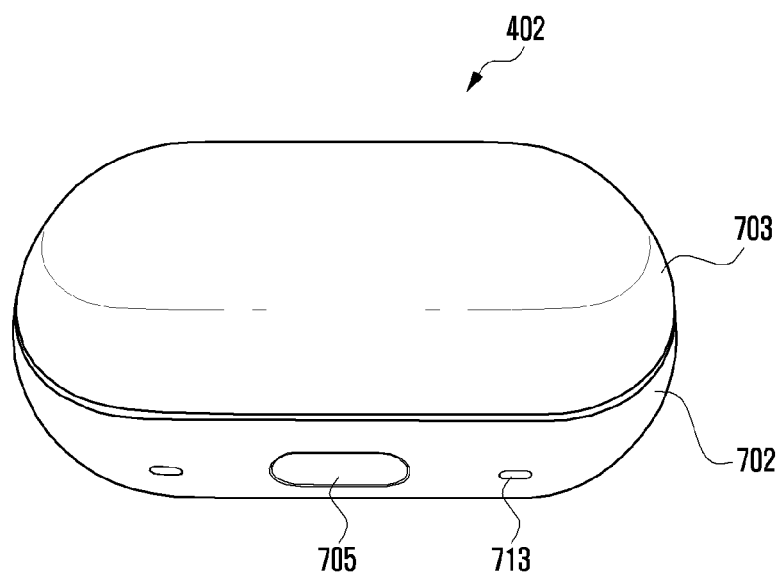
FIG. 8 illustrates a front perspective view of a cradle according to an embodiment.
Figure 9:
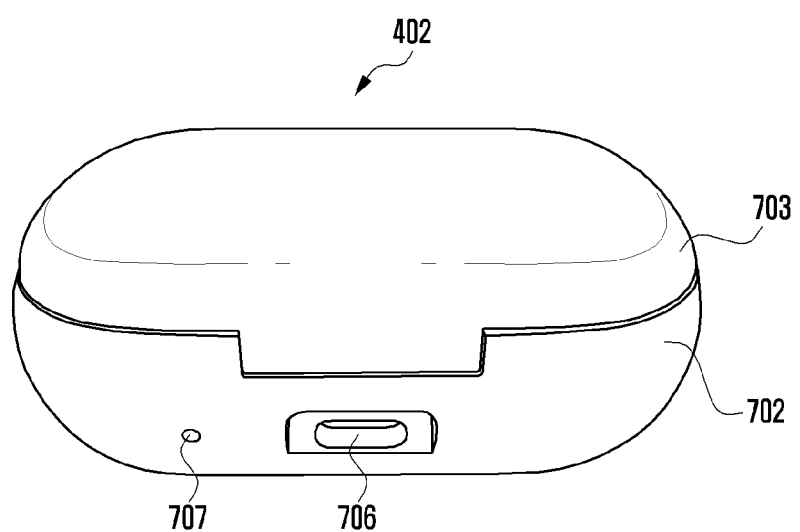
FIG. 9 illustrates a rear perspective view of a cradle according to an embodiment.

FIG. 8 illustrates a front perspective view of a cradle (e.g., the cradle 402 in FIG. 7) according to an embodiment. FIG. 9 illustrates a rear perspective view of a cradle (e.g., the cradle 402 in FIG. 7) according to an embodiment.

Referring to FIG. 8, in the cradle 402 according to one embodiment of the disclosure, when the first housing structure 701 and the second housing structure 703 form a given angle, for example, an angle between 0 degree and 10 degrees, the second housing structure 703 may cover the front surface of the first housing structure 701 because the first housing structure 701 and the second housing structure 703 face each other. For example, the front surface of the first housing structure 701 may mean a surface in which grooves (e.g., the grooves 704 in FIG. 7) having hearables (e.g., the hearables 401 in FIG. 7) seated therein have been formed.

According to one embodiment, the first housing structure 701 and the second housing structure 703 may be coupled when the second housing structure 703 fully covers the front surface of the first housing structure 701. The coupling may be released by a manipulation of a physical button 705 positioned on one side of the first housing structure 701. For example, a user may change the close state in which first housing structure 701 and the second housing structure 703 have been coupled to the open state in which the first housing structure 701 and the second housing structure 703 form a given angle by pressing the physical button 705 positioned on one side of the first housing structure 701.

According to one embodiment, in the close state, the cradle 402 may supply power to the hearables 401 kept in the grooves 704 of the cradle 402. According to one embodiment, an LED device (e.g., the first LED device) 713, that is, a user interface device, may be positioned on the side of the first housing 425. For example, the LED device 713 may be positioned on the periphery of the physical button 705, and may include at least one first LED device 713. According to one embodiment, the LED device 713 may display a given color indicative of the charging state of the hearables 401. For example, the LED device 713 may display red color while the hearables 401 are charged, or may display green color if the hearables 401 have been fully charged.

Referring to FIG. 9, a wired interface terminal 706 for being connected to a wired power supply may be positioned on the other side of the first housing structure 701. For example, the wired power supply may be a device connected to the cradle 402 in a wired way like a travel adapter (TA), for supplying power to the cradle 402, and may include a wired high voltage (HV) device (e.g., a device supporting adaptive fast charge (AFC) or quick charge (QC)), for example.

According to one embodiment, the first housing structure 701 may include an LED device (e.g., the second LED device) 707 for notifying that a wired power supply is connected to the cradle 402. For example, the LED device 707 may be positioned on the periphery of the wired interface terminal 706, and may include one LED device 707. According to one embodiment, the LED device 707 may display a given color, for example, red color when the wired power supply is connected to the cradle 402.

Figure 10:
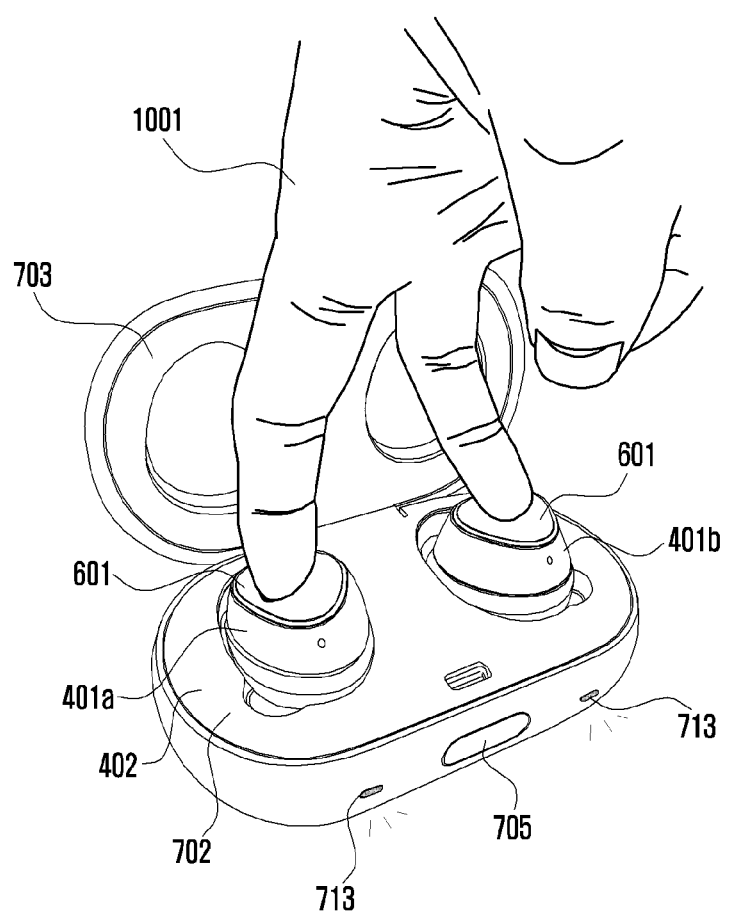
FIG. 10 illustrates an example describing a method of starting a Bluetooth pairing mode of hearables according to an embodiment.

FIG. 10 illustrates an example describing a method of starting a Bluetooth pairing mode of the hearables 401 according to an embodiment.

Referring to FIG. 10, the hearables 401 according to one embodiment of the disclosure may receive a given user input 1001 in the state in which the hearables 401 have been seated in the grooves 704 of the cradle 402, and may perform short-distance communication in response to the user input 1001. For example, the example of FIG. 10 may illustrate the state in which the first hearable 401a and the second hearable 401b have been seated in the grooves 704 formed in the first housing structure 701. According to one embodiment, when the hearables 401 are seated in the grooves 704, the opposite sides of the ear plugs of the hearables 401 may be exposed when viewed from the top of the first housing structure 701. According to one embodiment, the touch sensors 601 may be positioned on the opposite sides of the ear plugs of the hearables 401. A user may control a function of the hearables 401 using the touch sensors 601. For example, in the state in which a user has the ear plugs inserted into his or her ears, the user may perform a function of the hearables 401, for example, volume control or control of the selection of song using the touch sensors 601. For another example, the touch sensors 601 are exposed even in the state in which the hearables 401 have been seated in the grooves 704 of the cradle 402. Accordingly, a user may control the hearables 401 using the touch sensors 601 in the state in which the hearables 401 have been seated in the grooves 704. For example, a user may control short-distance communication, for example, a Bluetooth communication pairing mode using the touch sensors 601 in the state in which the hearables 401 have been seated in the cradle 402.

According to one embodiment, the given user input 1001 may be a touch input maintained by a user for a given time in the state in which the hearables 401 have been seated in the grooves 704 of the cradle 402. For example, the user input 1001 may be a touch input simultaneously performed on the touch sensor 601 of the first hearable 401a and the touch sensor 601 of the second hearable 401b by a user for a given time. For example, if a user performs a touch input on the touch sensor 601 of the first hearable 401a and the touch sensor 601 of the second hearable 401b at the same time for 2 seconds or more, the hearables 401 may start a Bluetooth communication pairing mode.

According to one embodiment, the hearables 401 may change its mode to a data transmission mode in response to a given user input, and may generate a control signal corresponding to the Bluetooth pairing mode of the hearables 401. To this end, the hearables 401 may disable the charging IC 412, and may control a switching element (e.g., the switching element 414 in FIG. 4) connected to a power source terminal (e.g., the first terminal 721 in FIG. 4) by outputting a given control signal corresponding to the Bluetooth pairing mode. Accordingly, a current of the power source terminal swings in accordance with a switching operation of the switching element 414 based on the given control signal. The cradle 402 may identify that the mode of the hearables 401 is the Bluetooth pairing mode by detecting the swinging current through the connector pins 711 and 712.

According to one embodiment, the cradle 402 may output given notification using the LED device 713 in response to the identification of the hearables 401 being in a Bluetooth pairing mode. For example, after a user performs a user input to request the hearables 401 to enter a Bluetooth pairing mode, the user can recognize that the mode of the hearables 401 is the Bluetooth pairing mode through the LED device 713 of the cradle 402.

Figure 11:
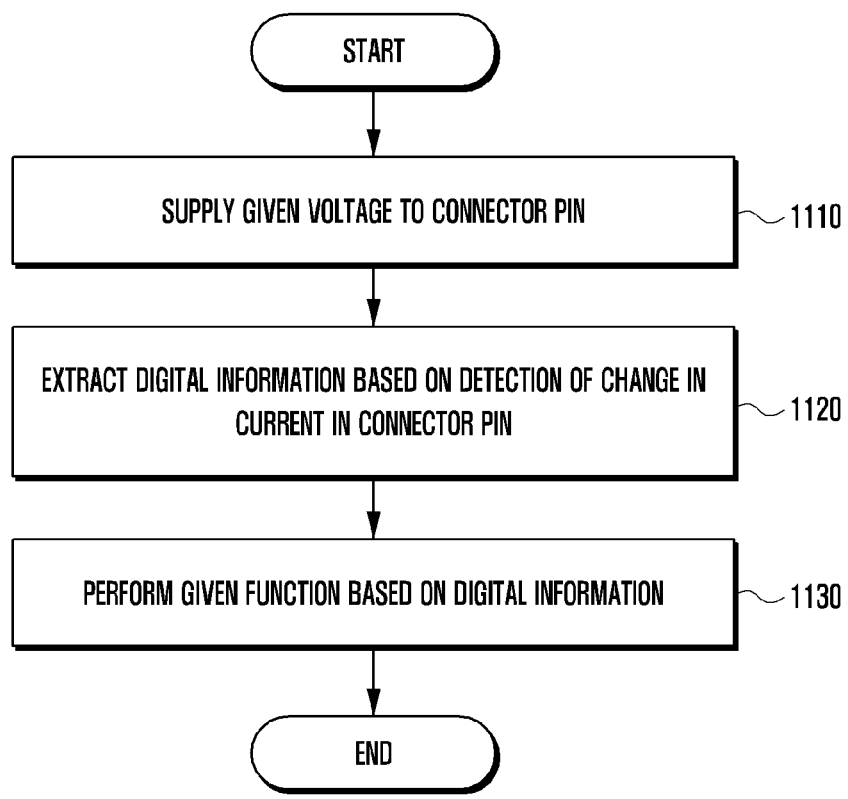
FIG. 11 illustrates an operation flowchart of a first electronic device according to an embodiment.

FIG. 11 illustrates an operation flowchart of a first electronic device according to an embodiment.

At operation 1110, a first electronic device (e.g., the first electronic device 402 in FIG. 4) according to one embodiment may transmit power of a given voltage to the second electronic device 401 in response to the identification of the second electronic device 401 being connected thereto through the connector pins 431 and 432. For example, the first electronic device 402 may generate a high potential voltage suitable for the second electronic device 401 using power stored in the battery 411, and may output the generated high potential voltage to the first connector pin 431. Alternatively, the first electronic device 402 may generate a high potential voltage suitable for the second electronic device 401 using power supplied by an external power source device (e.g., a travel adapter (TA)), and may output the generated high potential voltage to the first connector pin 431.

At operation 1120, the first electronic device 402 according to one embodiment may detect a change in the current of the connector pins 431 and 432 while supplying the power of a given voltage. For example, the first electronic device 402 may detect a change in the current of the first connector pin 431 while supplying a given high potential voltage to the first connector pin 431. According to one embodiment, the first controller 423 may identify whether data is transmitted by the second electronic device 401 by detecting a change in the current of the first connector pin 431 while supplying power through the connector pins 431 and 432. According to one embodiment, an operation for the first controller 423 to detect a change in the current of the first connector pin 431 may include an operation for the first controller 423 to receive a comparison value between currents at both ends of the sensing resistor 424 from the current sensing IC 422 and to identify whether the received value is greater than a given value (e.g., a reference value).

The first electronic device 402 according to one embodiment may detect a change in the current of the connector pins 431 and 432 when a current of the connector pins 431 and 432 exceeds a given range, may extract digital information based on a value of a change in the current, and may perform a given function based on the extracted digital information. For example, when a current change of a given range or more is detected in the first connector pin 431 while power is supplied through the connector pins 431 and 432, the first controller 423 may identify the state of the second electronic device 401 transmitting data. According to one embodiment, if the state of the second electronic device 401 transmitting data is identified, the first controller 423 may obtain data transmitted by the second electronic device 401 by extracting digital information based on a change in the current using the current sensing IC 422. For example, the first controller 423 may receive a comparison value between currents at both ends of the sensing resistor 424 from the current sensing IC 422, may identify the state of the second electronic device 401 transmitting data when the received value is greater than a given value, and may obtain data transmitted by the second electronic device 401 based on a change in the comparison value between the currents at both ends of the sensing resistor 424.

At operation 1130, the first electronic device 402 according to one embodiment may obtain the data transmitted by the second electronic device 401 based on a change in the comparison value between the currents at both ends of the sensing resistor 424. The data may be information related to the state of the second electronic device 401, for example. For example, the first controller 423 may determine a state of the second electronic device 401 based on digital information extracted by the current sensing IC 422, and may perform a given function based on the identified state of the second electronic device 401. For example, if the state of the second electronic device 401 is a given state, the first controller 423 may control a user interface device (e.g., the LED device 713 in FIG. 7) to output given notification related to the state of the second electronic device 401. For example, if the mode of the second electronic device 401 is a short-distance communication mode, for example, a Bluetooth pairing mode, the first controller 423 may control a user interface device (e.g., the LED device 713 in FIG. 7) to output notification for notifying that the mode of the second electronic device 401 is the Bluetooth pairing mode. A user can recognize that the mode of the second electronic device 401 is the Bluetooth pairing mode through a user interface device (e.g., the LED device 713 in FIG. 7) positioned in the first electronic device 402.

FIG. 12 is an operation flowchart of a second electronic device according to an embodiment.

At operation 1210 and operation 1220, a second electronic device (e.g., the second electronic device 401 in FIG. 4) according to one embodiment may identify that it has been connected to the first electronic device 402 by detecting the first connector pin 431 brought into contact with the first terminal 433 and the second connector pin 432 brought into contact with the second terminal 434.

The second electronic device 401 according to one embodiment may receive power of a given voltage from the first electronic device 402, and may charge the battery 411 using the given voltage. For example, the second controller 413 of the second electronic device 401 may control a high potential voltage to be applied to the charging IC 412 by enabling the charging IC 412 and turning off the switching element 414 connected to the first terminal 433 to which a high potential voltage is applied. According to one embodiment, the charging IC 412 may charge the battery 411 using a high potential voltage, and may generate different voltages or different current levels suitable for parts included in the second electronic device 401.

At operation 1230, the second electronic device 401 according to one embodiment may detect a given user input through touch sensors (e.g., the touch sensors 601 in FIG. 6) while charging the battery 411. For example, the given user input may be a user input to request the second electronic device 401 to perform short-distance communication. According to one embodiment, the second electronic device 401 may be the hearables 401, and may receive a user input (e.g., the user input 1001 in FIG. 10) to request the second electronic device 401 to enter a Bluetooth pairing mode through the touch sensors 601 positioned in at least some of the hearables 401.

At operation 1240, when a given user input is detected (e.g., if a result of operation 1230 is "Yes"), the second electronic device 401 according to one embodiment may check the capacity of the battery 411, and may identify whether the capacity of the battery 411 is greater than a given range. According to one embodiment, the given range may be 5% to 10% in the capacity of the battery, for example, but may not be limited thereto. When a given user input is not detected (e.g., if a result of operation 1230 is "No"), the second electronic device 401 according to one embodiment may continue to perform operation 1220.

At operation 1250, when the capacity of the battery is greater than the given range (e.g., if a result of operation 1240 is "Yes"), the second electronic device according to one embodiment may stop the charging of the battery 411 and change its mode to a data transmission mode. For example, the second electronic device 401 may disable the charging IC 412 in the data transmission mode. The second electronic device 401 according to one embodiment may output a given current through a terminal. For example, the second electronic device 401 may connect the first terminal 433 and the pull-down resistor 415 by turning on the switching element 414. According to one embodiment, when the first terminal 433 and the pull-down resistor 415 are connected while power is received through the first terminal 433, a current of the first terminal 433 temporarily rises. Accordingly, the second electronic device 401 may notify the first electronic device 402 of the start of the data transmission mode. For example, the first electronic device 402 may identify that the mode of the second electronic device 401 is the data transmission mode by detecting a change in the current of the first connector pin 431 physically brought into contact with the first terminal 433.

According to one embodiment, the second electronic device 401 may transmit data to the first electronic device 402 in such a manner that a current of the first terminal 433 has a change in the current corresponding to given bit information by repeatedly controlling the turn-on or turn-off of the switching element 414 using a control signal. For example, the second controller 413 of the second electronic device 401 may generate a control signal corresponding to state information of the second electronic device 401. According to one embodiment, a given user input 1001 may be a user input to request the second electronic device 401 to perform short-distance communication. The second controller 413 may perform short-distance communication with an external device, for example, a third electronic device (e.g., the third electronic device 403 in FIG. 4) in response to the user input 1001. The second controller 413 may generate a control signal for notifying the state of the second electronic device 401 performing short-distance communication while performing the short-distance communication.

The electronic device and data communication method according to various embodiments of the disclosure can achieve a simple structure and reduce a part unit price by reducing lines for power transmission and reception and data communication and the number of connector pins.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with, or "connected to" another element (e.g., a second element), it means that the element may be coupled with the other element directly (e.g., in a wired way), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for supplying power to an external device, comprising:
    a housing including at least one groove for keeping the external device;
    a connector pin configured to supply power to the external device, the connector pin comprising:
        a first connector pin positioned in an area of the groove to supply a high potential voltage, and
        a second connector pin positioned in another area of the groove to supply a low potential voltage;
    a power supply configured to supply a given high potential voltage to the first connector pin;
    a current sensing circuit configured to detect a current of the first connector pin; and
    a controller operatively connected to the connector pin, the power supply, and the current sensing circuit,
    wherein the controller is configured to:
        supply a given high potential voltage to the first connector pin based on a detection of the external device being connected to the connector pin,
        detect the current of the first connector pin while the given high potential voltage is supplied,
        extract digital information based on a current change of a given range or more being detected in the first connector pin, and
        perform a given function based on the extracted digital information.

2. The electronic device of claim 1, further comprising a user interface device,
    wherein the controller is further configured to:
        identify a state of the external device based on the extracted digital information, and
        control the user interface device to output a given notification related to the identified state of the external device.

3. The electronic device of claim 2, wherein the state of the external device comprises the external device being in a Bluetooth pairing mode.

4. The electronic device of claim 2, wherein the user interface device comprises an LED device.

5. The electronic device of claim 1, further comprising a sensing resistor positioned between the power supply and the first connector pin,
    wherein the current sensing circuit is configured to:
        detect currents at both ends of the sensing resistor, and
        transmit a comparison value between the currents at both ends of the sensing resistor to the controller.

6. The electronic device of claim 5, wherein the controller is further configured to:
    receive the comparison value from the current sensing circuit, and
    extract the digital information based on a change in the current of the first connector pin based on the comparison value exceeding a reference value.

7. A method of driving an electronic device for supplying power to an external device,
    wherein the electronic device comprises a housing including at least one groove for keeping the external device, a connector pin configured to supply power to the external device, the connector pin comprising a first connector pin positioned in an area of the groove to supply a high potential voltage and a second connector pin positioned in another area of the groove to supply a low potential voltage, a power supply configured to supply a given high potential voltage to the first connector pin, and a current sensing circuit configured to detect a current of the first connector pin, and
    wherein the method comprises:
        supplying a given high potential voltage to the first connector pin based on a detection of the external device being connected to the connector pin,
        detecting the current of the first connector pin while the given high potential voltage is supplied,
        extracting digital information based on a current change of a given range or more being detected in the first connector pin, and
        performing a given function based on the extracted digital information.

8. The method of claim 7, further comprising:
    identifying a state of the external device based on the extracted digital information; and
    outputting a given notification related to the identified state of the external device.

9. The method of claim 8, wherein the state of the external device comprises the external device being in a Bluetooth pairing mode.

10. The method of claim 7, wherein:
    the electronic device further comprises a sensing resistor positioned between the power supply and the first connector pin; and
    detecting the current of the first connector pin comprises:
        detecting currents at both ends of the sensing resistor, and
        identifying a comparison value between the currents at both ends of the sensing resistor.

11. The method of claim 10, wherein extracting digital information comprises:
    comparing the comparison value with a reference value; and extracting the digital information based on a change in the current of the first connector pin based on the comparison value exceeding the reference value.

\* \* \* \* \*